US012126009B2

(12) United States Patent
Duong et al.

(10) Patent No.: US 12,126,009 B2
(45) Date of Patent: Oct. 22, 2024

(54) INTERMITTENTLY COATED DRY ELECTRODE FOR ENERGY STORAGE DEVICE AND METHOD OF MANUFACTURING THE SAME

(71) Applicant: Maxwell Technologies, Inc., San Diego, CA (US)

(72) Inventors: Hieu Minh Duong, Rosemead, CA (US); Yudi Yudi, Alameda, CA (US); Ziying Wang, San Diego, CA (US); Joon Ho Shin, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 18/465,801

(22) Filed: Sep. 12, 2023

(65) Prior Publication Data

US 2023/0420643 A1    Dec. 28, 2023

Related U.S. Application Data

(60) Continuation of application No. 17/717,510, filed on Apr. 11, 2022, now Pat. No. 11,799,069, which is a
(Continued)

(51) Int. Cl.
*H01M 4/139* (2010.01)
*B32B 37/00* (2006.01)
(Continued)

(52) U.S. Cl.
CPC ............. *H01M 4/139* (2013.01); *B32B 37/00* (2013.01); *B32B 37/0053* (2013.01);
(Continued)

(58) Field of Classification Search
CPC ..... H01M 4/139; B32B 37/00; B32B 37/0053
See application file for complete search history.

(56) References Cited

U.S. PATENT DOCUMENTS 7,352,558 B2   4/2008   Zhong et al.
7,433,174 B2   10/2008  Miller
(Continued)

FOREIGN PATENT DOCUMENTS

CN       1838999      9/2006
CN     102592834      7/2012
(Continued)

OTHER PUBLICATIONS

US 11,764,351 B2, 09/2023, Duong et al. (withdrawn)
(Continued)

*Primary Examiner* — Amanda C. Walke
(74) *Attorney, Agent, or Firm* — Knobbe Martens Olson & Bear LLP

(57) ABSTRACT

Proposed are methods for manufacturing intermittently coated dry electrodes for energy storage devices and energy storage devices including the intermittently coated dry electrodes. In one embodiment, the method includes providing a metal layer and providing an electrochemically active free-standing film formed of a dry active material. The method also includes combining the electrochemically active free-standing film and the metal layer to form a combined layer. The method further includes removing a portion of the electrochemically active free-standing film from the combined layer so that the electrochemically active free-standing film is intermittently formed on the metal layer in a longitudinal direction of the metal layer.

20 Claims, 12 Drawing Sheets

Related U.S. Application Data division of application No. 16/675,012, filed on Nov. 5, 2019, now Pat. No. 11,367,864.

(60) Provisional application No. 62/757,609, filed on Nov. 8, 2018.

(51) Int. Cl.
*H01G 11/26* (2013.01)
*H01G 11/52* (2013.01)
*H01G 11/86* (2013.01)
*H01M 4/04* (2006.01)
*H01M 4/13* (2010.01)
*H01M 4/38* (2006.01)
*H01M 10/0525* (2010.01)
*H01M 4/02* (2006.01)

(52) U.S. Cl.
CPC ............ *H01G 11/26* (2013.01); *H01G 11/52* (2013.01); *H01G 11/86* (2013.01); *H01M 4/0404* (2013.01); *H01M 4/13* (2013.01); *H01M 4/38* (2013.01); *H01M 10/0525* (2013.01); *H01M 2004/021* (2013.01); *H01M 2220/20* (2013.01)

(56) References Cited

U.S. PATENT DOCUMENTS

| | | | |
|---|---|---|---|
| 8,518,573 | B2 | 8/2013 | Miller |
| 10,020,533 | B2 | 7/2018 | Lindstrom |
| 11,367,864 | B2 | 6/2022 | Duong et al. |
| 2010/0110612 | A1 | 5/2010 | Zhong et al. |
| 2017/0069905 | A1* | 3/2017 | Koike ................ H01M 50/406 |
| 2017/0125815 | A1 | 5/2017 | Amin-Sanayei |
| 2018/0076464 | A1 | 3/2018 | Bauer |
| 2018/0076474 | A1 | 3/2018 | Glanz et al. |
| 2018/0226629 | A1 | 8/2018 | Hiroki |
| 2020/0152967 | A1 | 5/2020 | Duong et al. |
| 2020/0313175 | A1 | 10/2020 | Shin et al. |
| 2021/0234173 | A1 | 7/2021 | Wang |
| 2022/0006071 | A1 | 1/2022 | Petrowsky |

FOREIGN PATENT DOCUMENTS

| | | | | |
|---|---|---|---|---|
| CN | 104993152 | | 10/2015 | |
| CN | 209920524 | U * | 1/2020 | |
| CN | 111180743 | A * | 5/2020 | ......... B32B 37/0053 |
| EP | 3 033 793 | A1 | 6/2016 | |
| JP | 04-206358 | | 7/1992 | |
| JP | 2017-091954 | | 5/2017 | |
| JP | 2017-123264 | | 7/2017 | |
| KR | 20180100997 | A | 9/2018 | |
| WO | WO 15/022529 | A1 | 2/2015 | |

OTHER PUBLICATIONS

Wood et al., Aug. 29, 2017, Technical and economic analysis of solvent-based lithium-ion electrode drying with water and NMP, Drying Technology, 36(2): 1-11.
Second office action dated Feb. 1, 2024 in corresponding Chinese patent application No. 201980088315.7.
Notice of reasons for refusal dated Jan. 9, 2024 in Japanese patent application No. 2021-523391, 16 pp.
International Search Report and Written Opinion mailed Apr. 3, 2020 in International Application No. PCT/US2019/060257, in 13 pages.
International Preliminary Report on Patentability issued May 11, 2021 in International Application No. PCT/US2019/060257.
Office Action dated Mar. 31, 2022 in U.S. Appl. No. 16/675,012.
Office action dated Aug. 16, 2023 in corresponding Chinese patent application No. 201900883157.
Decision of Refusal dated May 16, 2024 in corresponding Japanese patent application No. 2021-523391, 12 pp.

* cited by examiner

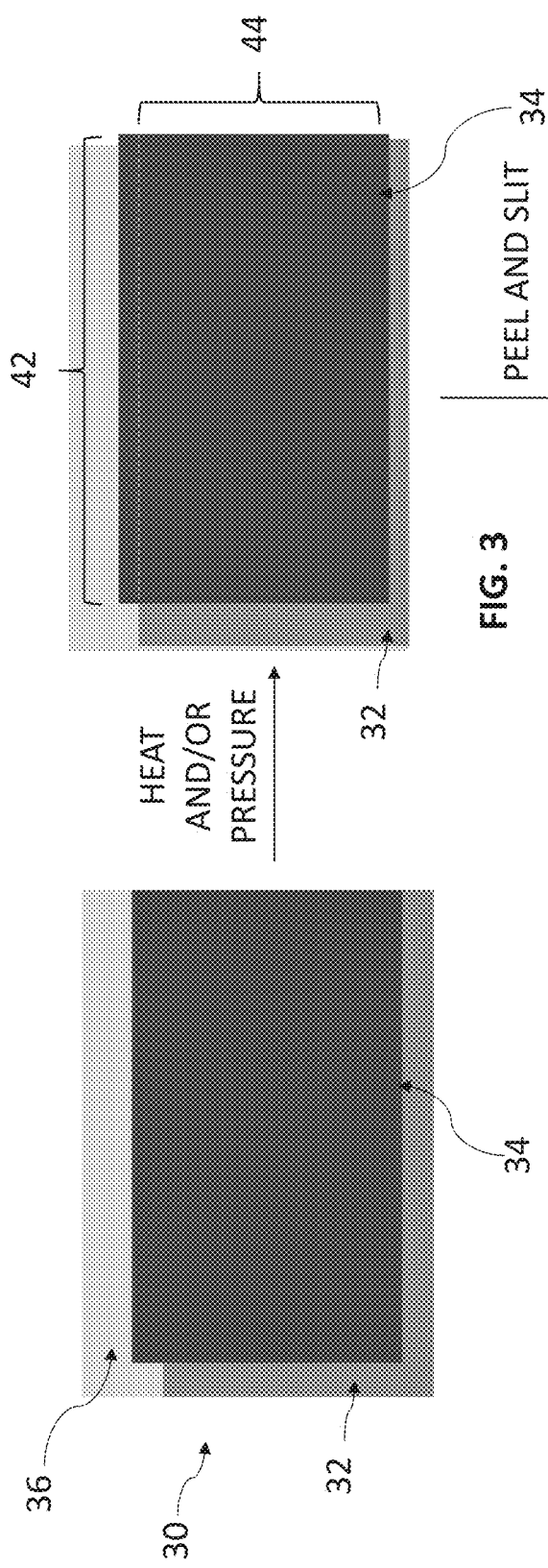
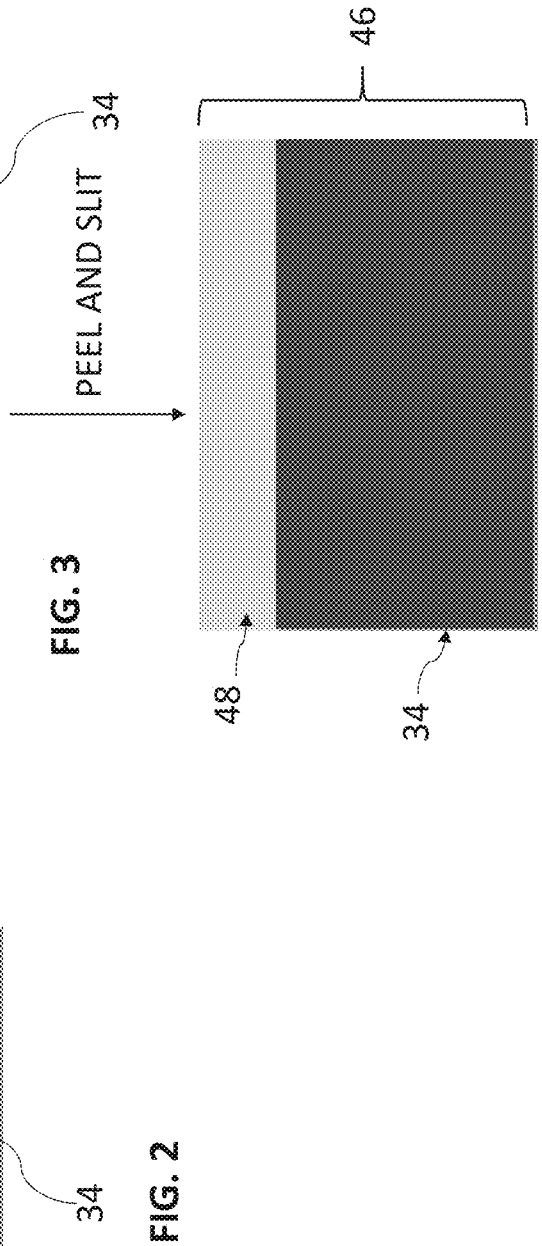

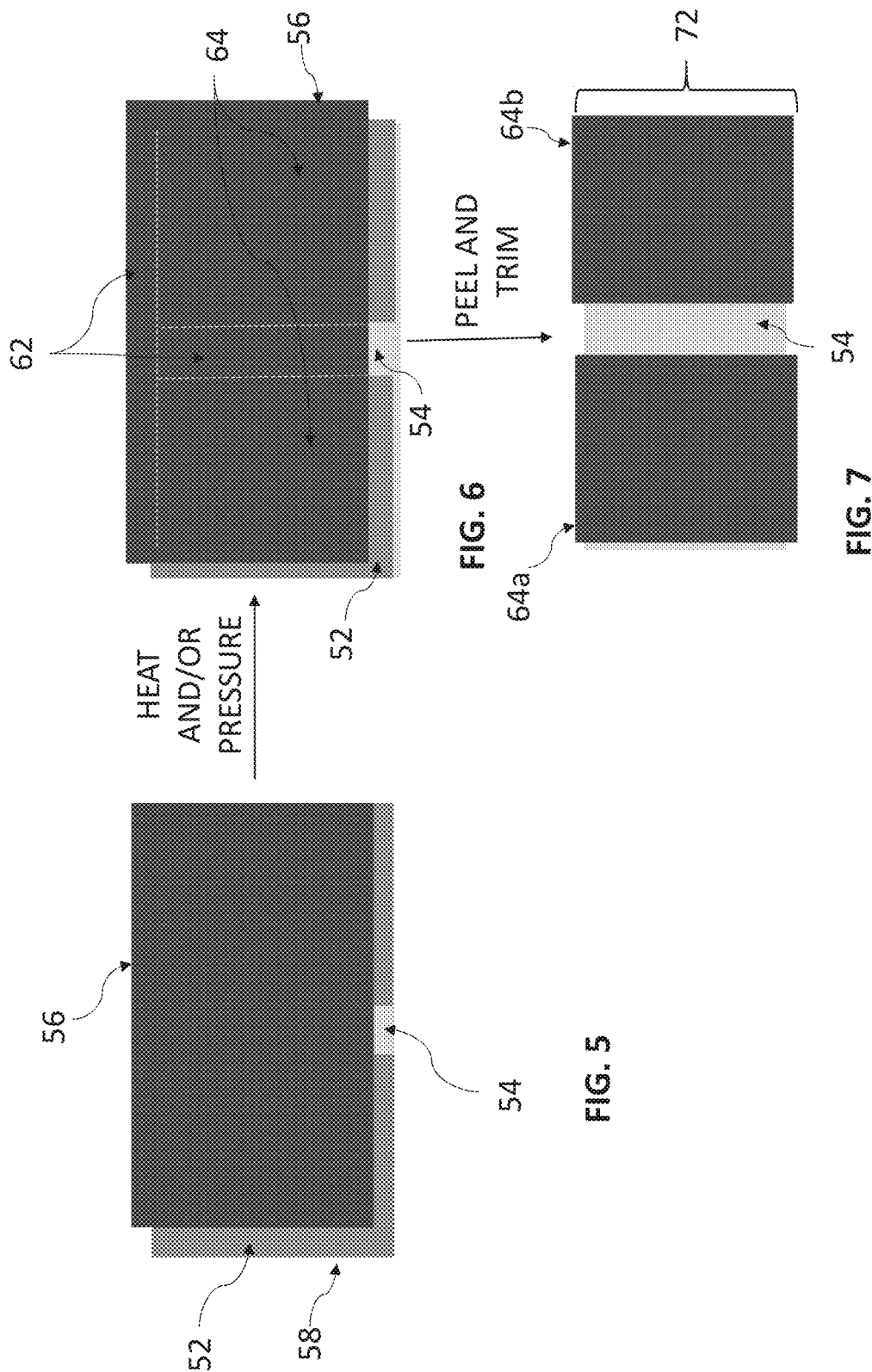

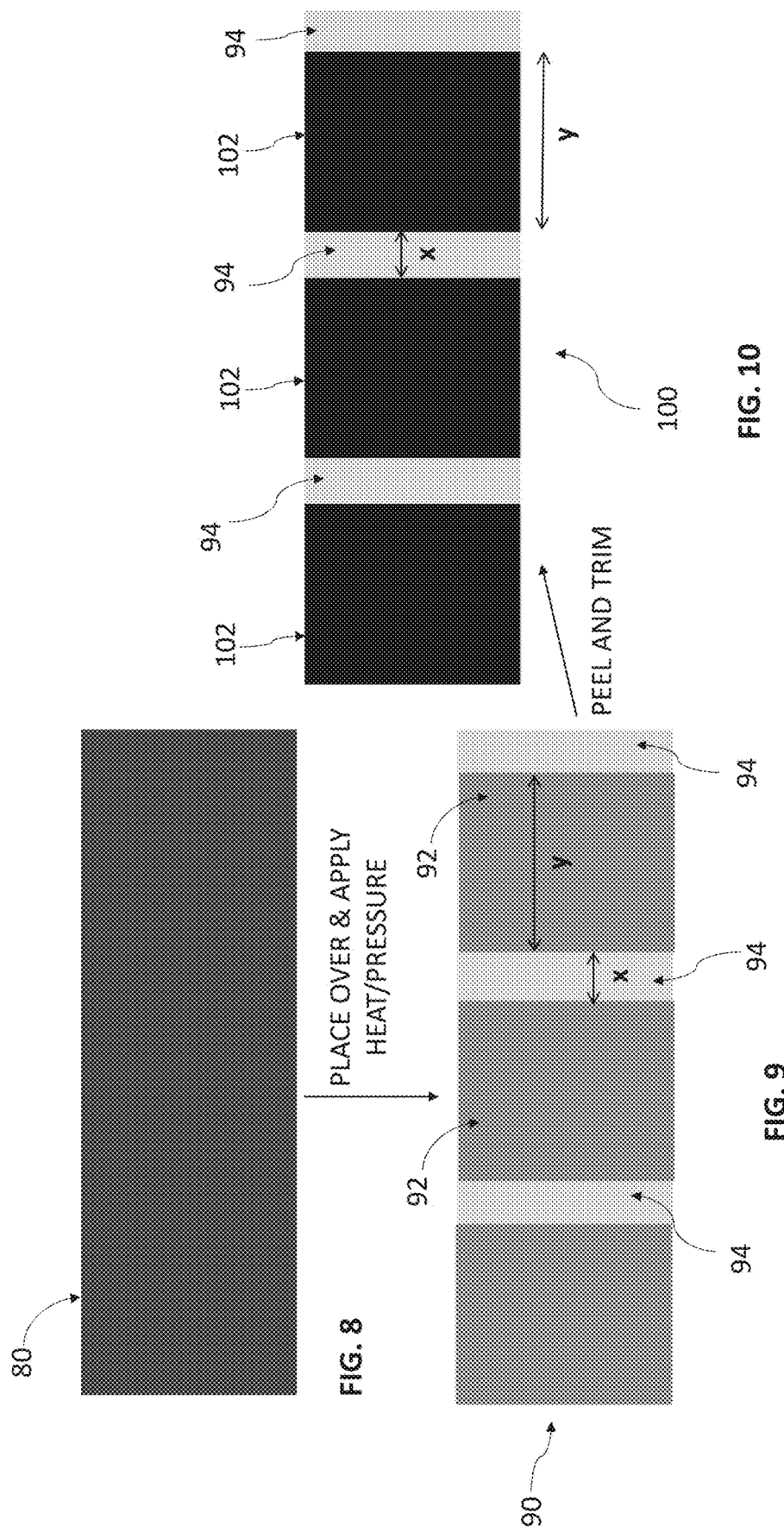

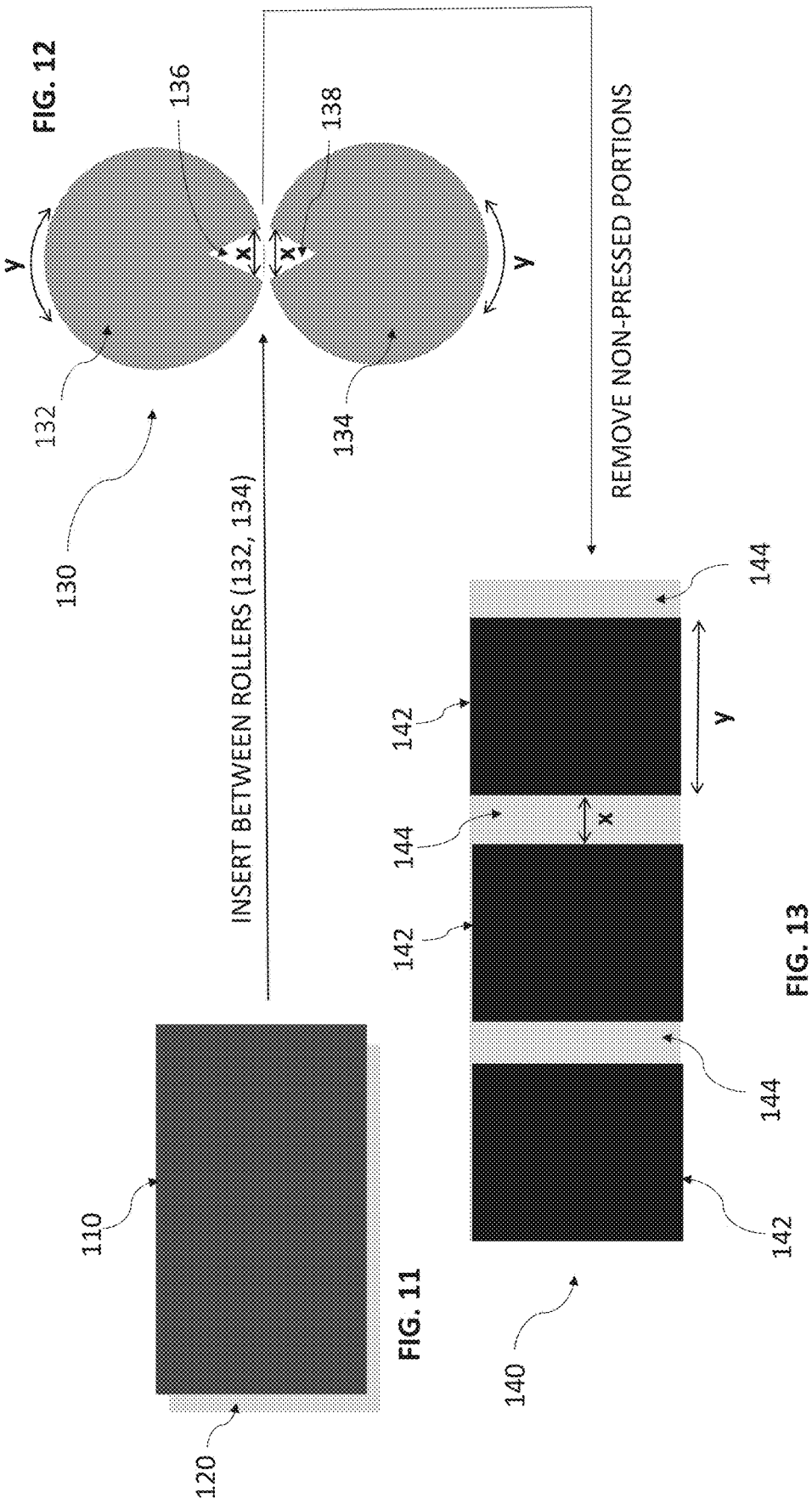

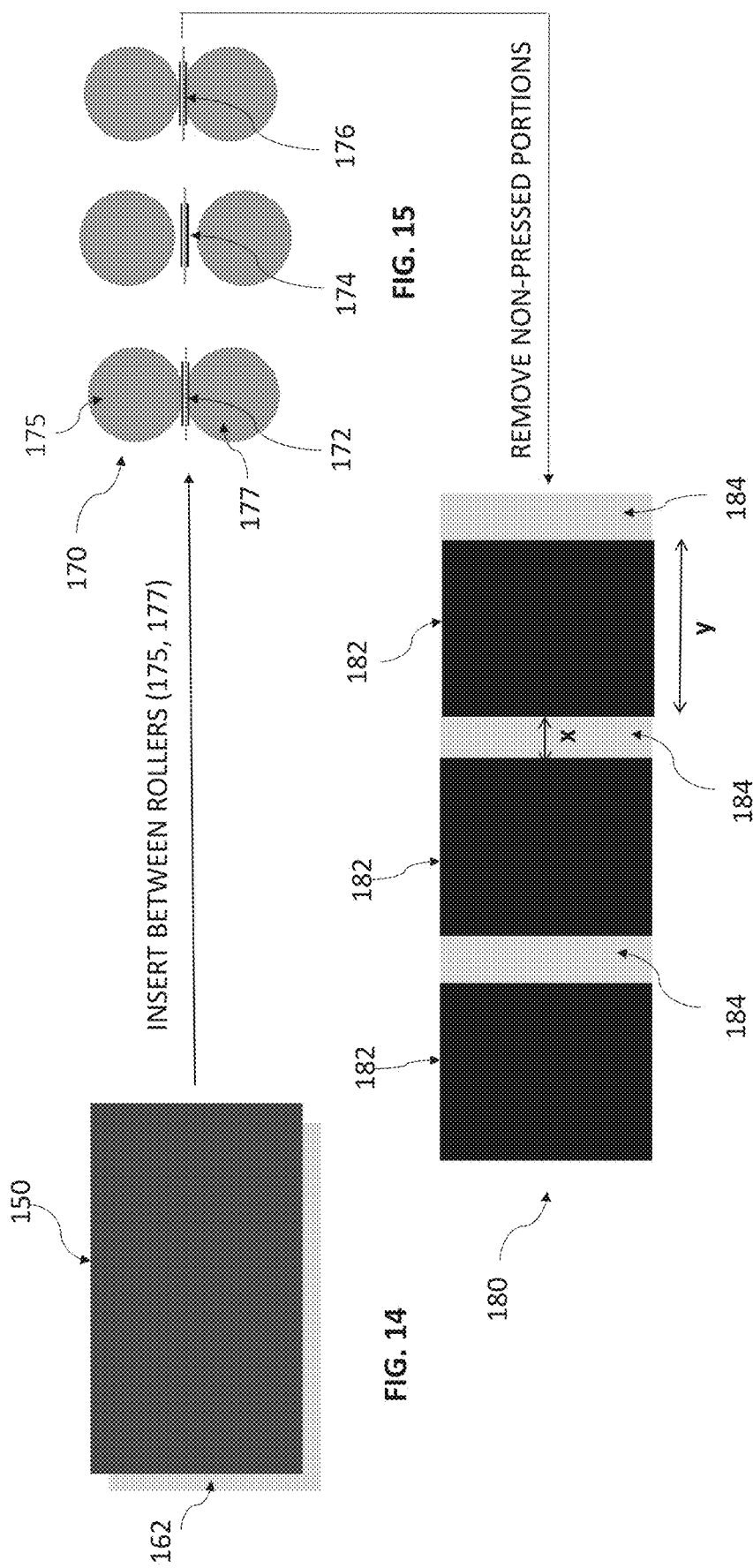

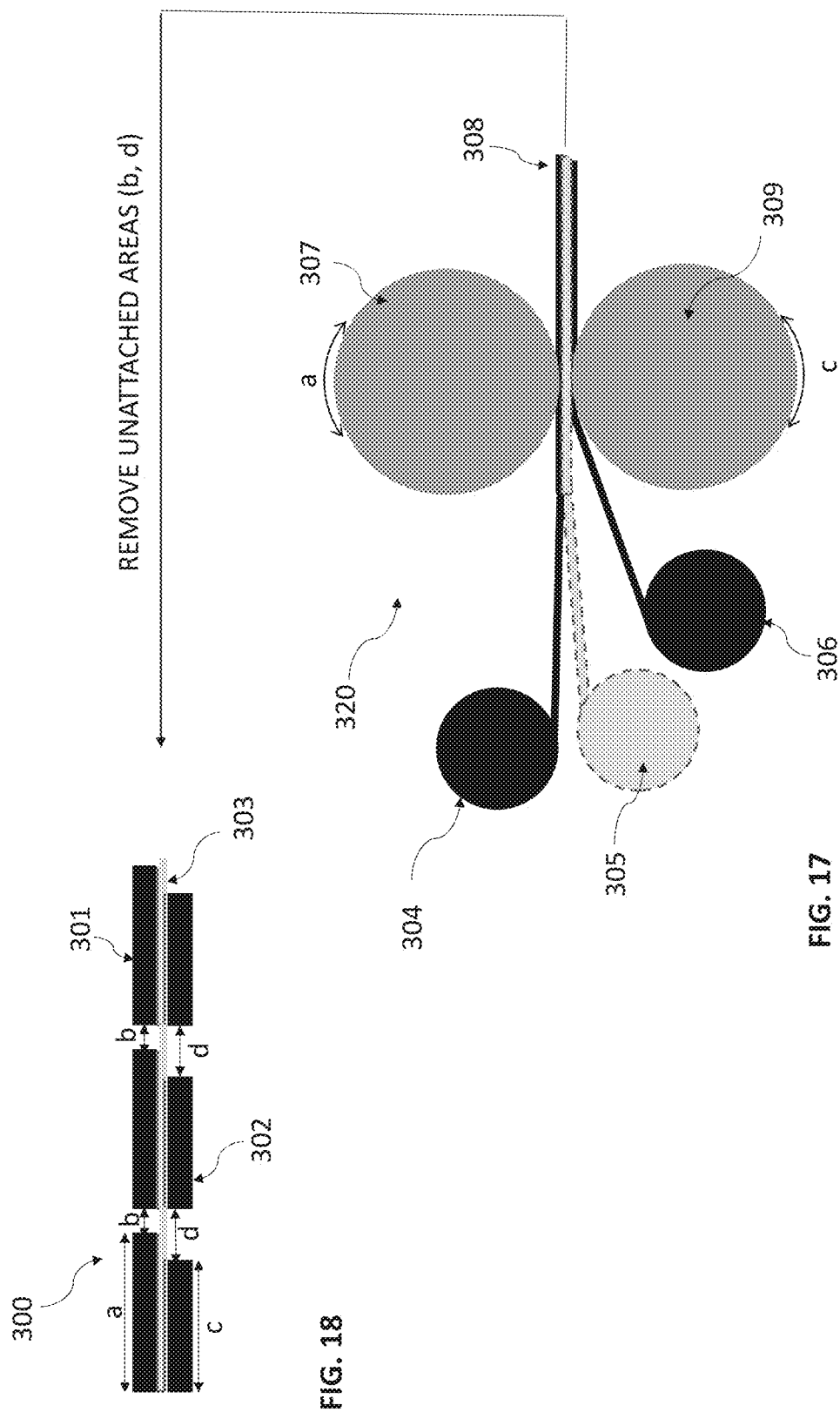

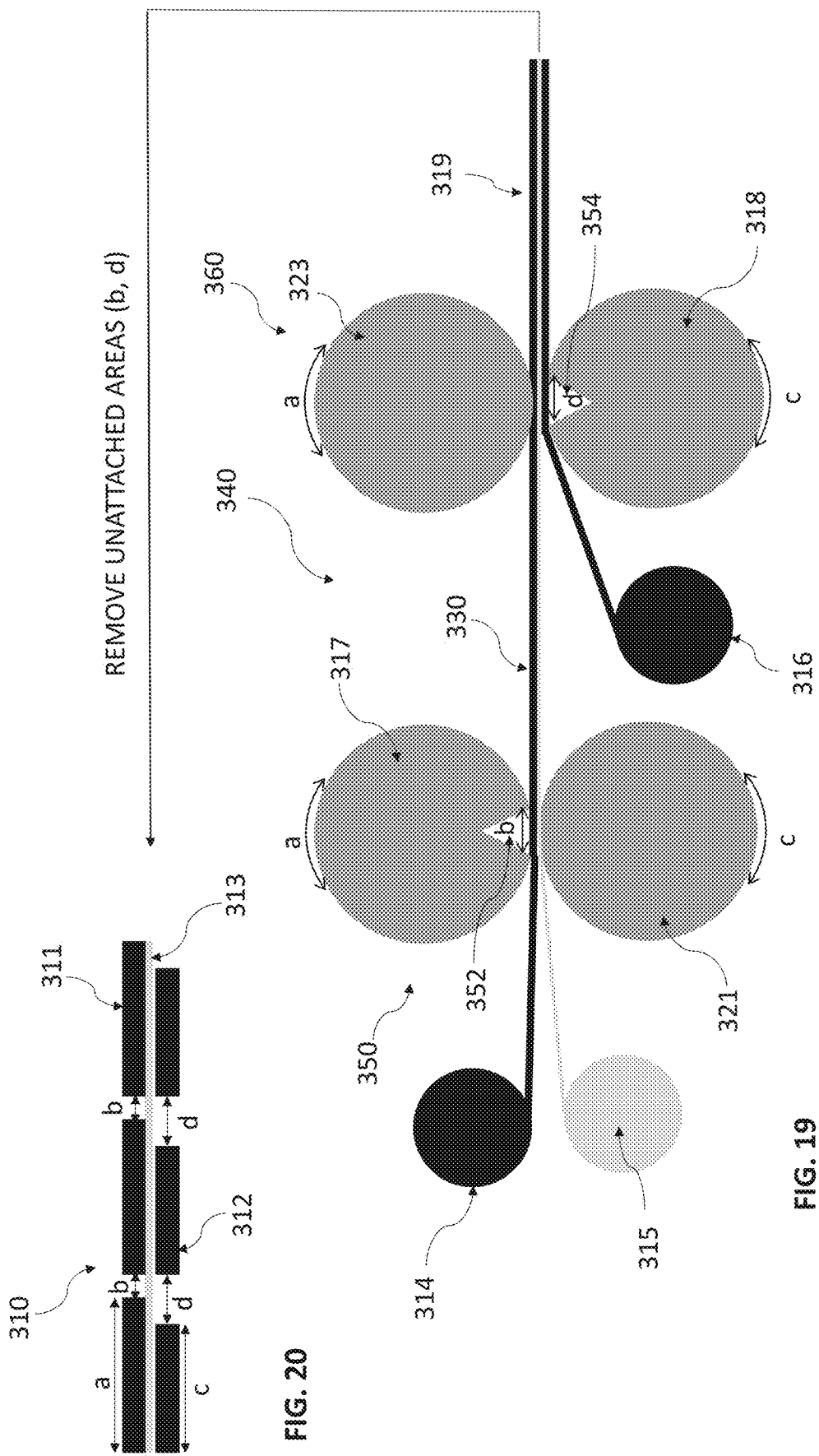

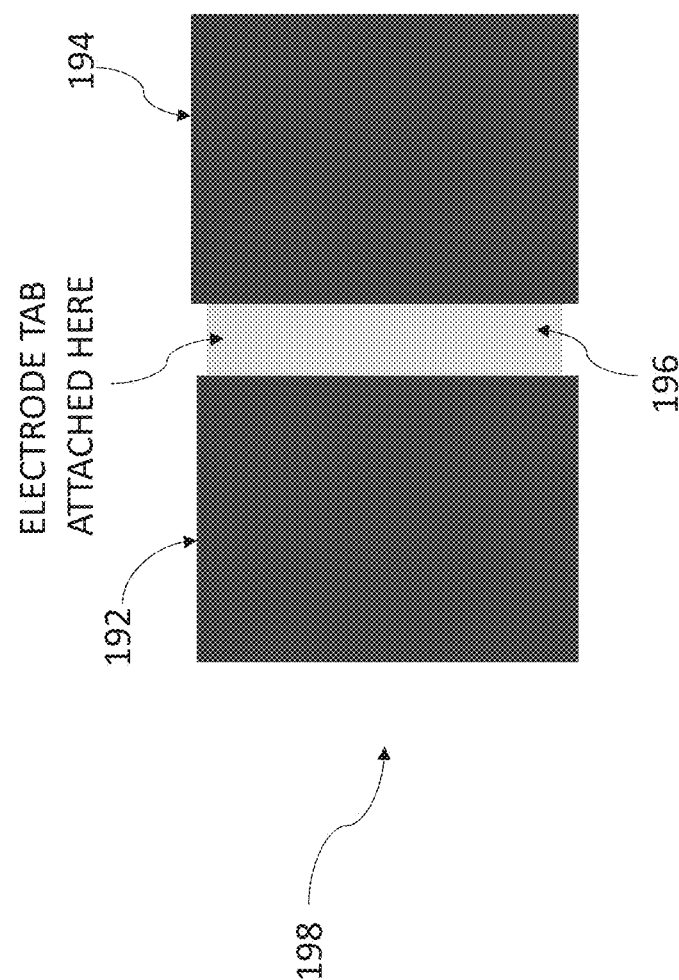

INTERMITTENTLY COATED DRY ELECTRODE FOR ENERGY STORAGE DEVICE AND METHOD OF MANUFACTURING THE SAME

RELATED APPLICATIONS

This application is a continuation of U.S. patent application Ser. No. 17/717,510, filed on Apr. 11, 2022, which is a divisional of U.S. patent application Ser. No. 16/675,012, filed on Nov. 5, 2019, now U.S. Pat. No. 11,367,864, issued Jun. 21, 2022, which claims priority to and the benefit of Provisional Application No. 62/757,609 filed on Nov. 8, 2018 in the U.S. Patent and Trademark Office, the entire contents of each of which are incorporated herein by reference.

BACKGROUND

Field

The described technology generally relates to energy storage devices, and specifically to methods for manufacturing intermittently coated dry electrodes for energy storage devices and energy storage devices including the intermittently coated dry electrodes.

Description of the Related Technology

Electrical energy storage cells are widely used to provide power to electronic, electromechanical, electrochemical, and other useful devices, for example, hybrid vehicles, plug-in hybrid vehicles and pure electric vehicles. Such cells include batteries such as primary chemical cells and secondary (rechargeable) cells, fuel cells, and various species of capacitors, including ultracapacitors. Increasing the operating power and energy of energy storage devices, including capacitors and batteries, would be desirable for enhancing energy storage, increasing power capability, and broadening real-world use cases.

SUMMARY

For purposes of summarizing the described technology, certain objects and advantages of the described technology are described herein. Not all such objects or advantages may be achieved in any particular embodiment of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

One inventive aspect is an intermittently coated dry electrode for an energy storage device.

Another aspect is a method of manufacturing an intermittently coated dry electrode for an energy storage device.

Another aspect is an energy storage device including intermittently coated dry electrodes.

Another aspect is a method of manufacturing a dry electrode for an energy storage device, comprising: providing a metal layer; providing an electrochemically active free-standing film formed of a dry active material; combining the electrochemically active free-standing film and the metal layer to form a combined layer; and removing a portion of the electrochemically active free-standing film from the combined layer so that the electrochemically active free-standing film is intermittently formed on the metal layer in a longitudinal direction of the metal layer.

Another aspect is a dry electrode for an energy storage device, comprising: a metal layer; and an electrochemically active free-standing film formed of a dry active material, wherein the electrochemically active free-standing film comprises a plurality of film portions intermittently formed on the metal layer in a longitudinal direction of the metal layer to expose a portion of the metal layer.

Another aspect is an energy storage device, comprising: a first electrode; a second electrode; and a separator interposed between the first and second electrodes, wherein each of the first and second electrodes comprises; a metal layer; and an electrochemically active free-standing film formed of a dry active material, wherein the electrochemically active free-standing film comprises a plurality of film portions intermittently formed on the metal layer in a longitudinal direction of the metal layer to expose a portion of the metal layer.

Another aspect is a method of manufacturing a dry electrode for an energy storage device, comprising: providing a metal layer; providing a first electrochemically active free-standing film formed of a dry active material; providing a second electrochemically active free-standing film formed of a dry active material; combining the first and second electrochemically active free-standing films with the metal layer to form a combined layer such that the metal layer is interposed between the first and second electrochemically active free-standing films; and removing a first portion of the first electrochemically active free-standing film and a second portion of the second electrochemically active free-standing film from the combined layer so that each of the first and second electrochemically active free-standing films is intermittently formed on the metal layer in a longitudinal direction of the metal layer.

BRIEF DESCRIPTION OF THE DRAWINGS

FIG. 2 illustrates an electrochemically active free-standing film placed over a continuously adhesive coated metal foil before heat and/pressure is applied thereto.

FIG. 3 illustrates the electrochemically active free-standing film laminated onto the continuously adhesive coated metal foil after heat and pressure is applied thereto.

FIG. 4 illustrates an example continuously coated dry electrode.

FIG. 5 illustrates an electrochemically active free-standing film placed over an intermittently adhesive coated metal foil before heat and pressure is applied thereto.

FIG. 6 illustrates the electrochemically active free-standing film laminated onto the intermittently adhesive coated metal foil after heat and pressure is applied thereto.

FIG. 7 illustrates an example intermittently coated dry electrode according to an embodiment.

FIG. 8 illustrates an electrochemically active free-active film according to an embodiment.

FIG. 9 illustrates an example metal foil that includes metal foil portions that are intermittently coated with adhesive and uncoated metal foil portions according to an embodiment.

FIG. 10 illustrates an intermittently coated dry electrode according to another embodiment.

FIG. 11 illustrates an electrochemically active free-active film placed over an example uncoated metal foil according to another embodiment.

FIG. 12 illustrates a laminator roll assembly according to an embodiment that produces intermittently coated electrode laminates.

FIG. 13 illustrates an intermittently coated dry electrode produced by the laminator roll assembly of FIG. 12, according to an embodiment.

FIG. 14 illustrates an electrochemically active free-active film placed over an example uncoated metal foil according to another embodiment.

FIG. 15 illustrates a laminator roll assembly according to another embodiment.

FIG. 16 illustrates an intermittently coated dry electrode produced by the laminator roll assembly of FIG. 15, according to another embodiment.

FIG. 17 illustrates a laminator roll assembly that produces an asymmetric intermittent double-side coated dry laminate shown in FIG. 18 according to an embodiment.

FIG. 18 illustrates a cross-sectional view of the asymmetric intermittent double-side coated dry laminate produced by the laminator roll assembly shown in FIG. 17 according to an embodiment.

FIG. 19 illustrates a laminator roll assembly that produces an asymmetric intermittent double-side coated dry laminate shown in FIG. 20 according to another embodiment.

FIG. 20 illustrates a cross-sectional view of the asymmetric intermittent double-side coated dry laminate produced by the laminator roll assembly shown in FIG. 19 according to another embodiment.

FIG. 21 illustrates an intermittently coated dry electrode to be connected to an electrode tab according to an embodiment.

DETAILED DESCRIPTION

Provided herein are various embodiments of a dry electrode for use in energy storage devices. In particular, in certain embodiments, energy storage devices disclosed herein include an intermittently coated dry electrode. For example, the described technology can provide dry electrode coating capability to include intermittent patterns for use in cylindrically wound cells with current collection designed across the width of the electrode. Also provided are methods for manufacturing such intermittently coated dry electrodes. The disclosed embodiments can provide a simplified and cost-effective electrode coating procedure for energy storage devices.

Energy storage devices such as lithium ion batteries have been relied on as a power source in numerous commercial and industrial uses, for example, in consumer devices, productivity devices, and in battery powered vehicles. However, demands placed on energy storage devices are continuously—and rapidly—growing. For example, the automotive industry is developing vehicles that rely on compact and efficient energy storage, such as plug-in hybrid vehicles and pure electric vehicles. Lithium ion batteries are well suited to meet future demands.

Key components of the storage potential of an energy storage device are electrodes. The electrochemical capabilities of electrodes, for example, the capacity and efficiency of battery electrodes, are governed by various factors. For example, distribution of active material, binder and additive(s); the physical properties of materials therein, such as particle size and surface area of active material; the surface properties of the active materials; and the physical characteristics of the electrode film, such as density, porosity, cohesiveness, and adhesiveness to a conductive element. Dry processing methods traditionally used a high shear and/or high pressure processing step to break up and commingle electrode film materials, which may contribute to structural advantages over electrode films produced using a wet process.

Figure 1:
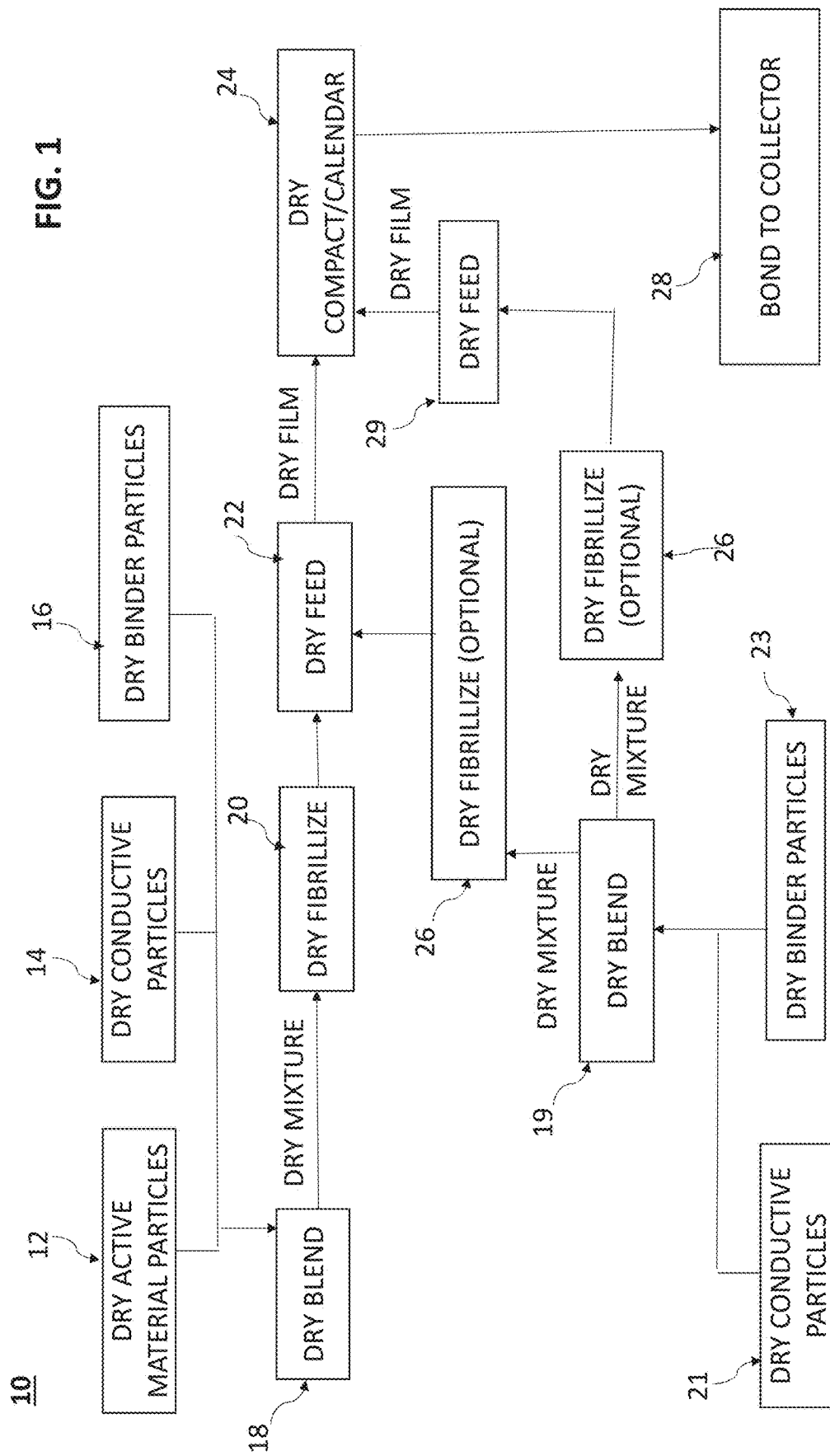
FIG. 1 is a block diagram illustrating a process for manufacturing a dry electrode for an energy storage device.

FIG. 1 is a block diagram illustrating a process 10 for making a dry electrode for an energy storage device. As used herein, the term "dry" implies non-use of liquid-phase solvents and additives in mixing and coating process of electrode during process steps described herein, other than during a final impregnating electrolyte step. The process 10 shown in FIG. 1 begins by dry blending 18 dry active material particles 12, dry conductive particles 14 and dry binder particles 16 to form a dry mixture. Furthermore, dry conductive particles 21 and dry binder particles 23 are also dry blended 19 to form a dry mixture which can be provided to an optional dry fibrillizing step 26 or 29. The dry mixture is fibrillized in a dry fibrillizing step 20 using, for example, a jet-mill (not shown). During the dry fibrillizing step 20, high shear forces are applied to the dry mixture in order to physically stretch it and form a network of thin web-like fibers. In a dry feed step 22 or 29, the respective separate mixtures of dry particles formed in steps 19 and 20 are provided to respective containers (not shown) to form a dry film. The dry film is subsequently dry compacted and calendared by a roll-mill or calendar 24 to provide an embedded/intermixed dry film or a self-supporting electrode film (or electrochemically active free-standing film). The embedded/intermixed dry film is attached or bonded to a current collector (e.g., metal foil) 28. A more detailed process of making an embedded/intermixed dry film including types of materials forming the dry films and materials forming the current collector is disclosed in U.S. Pat. No. 7,352,558, which is incorporated by reference herein in its entirety.

A self-supporting dry electrode film manufactured above may provide improved characteristics relative to a typical electrode film that is manufactured using a wet process. For example, a dry electrode film as provided herein may provide one or more of improved film strength, improved cohesiveness, improved adhesiveness, improved electrical performance, or reduced incidence of defects. The defects may include holes, cracks, surface pits in the electrode film. The adhesiveness may be adhesiveness to a current collector. The electrical performance may be specific capacity. The film strength may be tensile strength.

The materials and methods provided herein can be implemented in various energy storage devices. As provided herein, an energy storage device can be a capacitor, a lithium ion capacitor (LIC), an ultracapacitor, a battery such as a lithium ion battery, or a hybrid energy storage device combining aspects of two or more of the foregoing.

FIGS. 2-4 illustrate a process of making an example dry electrode. The example dry electrode may be an anode or a cathode. Referring to FIG. 2, an electrochemically active free-standing film 34 is placed over a metal foil 30. The electrochemically active free-standing film 34 may be formed of an electrochemically active material. The electrochemically active material can be an anode active material or a cathode active material. The anode active material may include, for example, graphite, silicon, tin, lithium titanate, lithium metal, lithium alloy compound or composites derived from these compositions. The cathode active material may include, for example, nickel manganese cobalt oxide (NMC), nickel cobalt aluminum oxide (NCA), lithium cobalt oxide (LCO), lithium iron phosphate (LFP), activated carbon, lithium manganese oxide (LMO), lithium nickel manganese oxide (LNMO), iron sulfide, sulfur or composites derived from these compositions. The metal foil 30 may be formed of, for example, copper, aluminum, titanium, stainless steel or a combination thereof. The description of this paragraph applies to the remaining embodiments.

The metal foil 30 includes a continuously adhesive coated metal foil portion 32 and an uncoated metal foil portion 36. The continuously adhesive coated metal foil portion 32 is continuously coated with an adhesive in a longitudinal direction of the metal foil 30. The electrochemically active free-standing film 34 may be placed over a majority of the adhesive coated metal foil portion 32. The active free-standing film 34 may also be placed over a portion of the uncoated metal foil portion 36 as shown in FIG. 2. In some embodiments, the active free-standing film 34 may not be placed over any portion of the uncoated metal foil 36 (not shown). After heat and/or pressure is applied to the active free-standing film 34 and the adhesive coated metal foil portion 32, the active free-standing film 34 is laminated onto the adhesive coated metal foil portion 32 (FIG. 3). The laminated film of FIG. 3 includes an area of an unattached electrochemically active free-standing film 42 and an area of a film laminated to a coated metal foil 44. The portion of the adhesive coated metal foil 32 that is not directly attached to the active free-standing film 34 may be removed by, for example, peeling or slitting. A continuously adhesive coated dry electrode 46 is subsequently formed (FIG. 4). The dry electrode 46 of FIG. 4 includes an uncoated metal foil portion 48 that can be used for electrically connecting the dry electrode 46 to other electrical components such as an electrode tab, positioned inside the final electrical device. The size or dimension of the uncoated foil portion 48 generally constitutes a significant portion of the final dry electrode 46. Thus, the dimension of the continuously adhesive coated dry electrode 46 can be limited by the dimension of the uncoated portion 48.

FIGS. 5-7 illustrate a process of making an example intermittingly coated dry electrode according to an embodiment. Referring to FIG. 5, an electrochemically active free-standing film 56 is placed over a metal foil 58. The metal coil 58 is discontinuously or intermittently coated with an adhesive or an adhesive layer (not shown) in a longitudinal direction thereof. The adhesive layer may be formed from one or more of glue or thermoplastic such as polyethylene (PE), polyvinyl chloride (PVC), polystyrene (PS), acrylics, fluoropolymers, polyesters, polyimides, polyamides, polyurethanes, polycarbonates, carbon or a combination thereof. The adhesive layer may be conductive (e.g., carbon adhesive layer). The coating weight for the conductive adhesive layer may be in the range of about 1 gram per square meter per side to about 5 grams per square meter per side with a dry coating density of about 0.2 grams per square centimeter per side to about 1.1 grams per square centimeter per side. The above coating weight and density can provide an optimum balance between a mechanically robust attachment of free-standing active films and lower costs. For example, the conductive adhesive layer can be thin (lowest loading weight) and as low in density as possible (minimal carbon adhesive material usage). These weight and density numbers are merely examples and other weight and density values are also possible. This applies to the remaining embodiments. The metal coil 58 includes coated portions 52 (or intermittently adhesive coated metal foil portions) and an uncoated portion 54 (or uncoated metal foil portion). The uncoated portion 54 is interposed between the adhesive coated portions 52. The uncoated portion 54 may be placed around the middle of the metal foil 58 in the longitudinal direction of the metal foil 58, however, the position of the uncoated portion 54 is not limited thereto. The discontinuously coated metal foil 58 may be produced via, for example, as gravure roll coating or slot die coating or screen printing or laser jet printing.

After heat and/or pressure is applied to the stacked layers (58, 56), the active free-standing film 56 is laminated onto the adhesive coated metal foil portions 52 (FIG. 6). The laminated film of FIG. 6 includes an area of an unattached electrochemically active free-standing film 62 and an area of a film laminated onto a coated metal foil 64. The area of the unattached electrochemically active free-standing film 62 includes an upper portion and a middle portion (see two arrows shown in the upper region of FIG. 6) of the active free-standing film 56 as shown in FIG. 6. The area of the film laminated to the coated metal foil 64 includes left and right portions (see two arrows shown in the lower region of FIG. 6) of the active free-standing film 56 that vertically overlap the adhesive coated metal foil portions 52.

After the portion of the active free-standing film 56 that vertically overlaps the uncoated metal foil portion 54 is removed, a discontinuously or intermittently coated dry electrode 72 is formed (FIG. 7). The peeling/trimming or removal of the overlapping portion of the unattached free-standing film 62 can be carried out using, for example, an air knife and/or vacuum. Since the uncoated metal foil portion 54 is not coated with an adhesive and thus is not adhered to the corresponding portion of the active free-standing film 56, the overlapping free-standing film portion can be more easily removed compared to the continuously adhesive coated electrode shown in FIGS. 2-4. The dry electrode 72 includes two active free-standing film portions 64a and 64b that are discontinuously or intermittently formed with respect to each other. The dry electrode 72 includes an uncoated foil portion 54 that is used for electrically connecting the electrode 72 to other elements such as an electrode tab. The dimension of the uncoated portion 54 may be substantially smaller than the uncoated portion 48 of the continuously coated dry electrode 46 in FIG. 4. For example, the width of the uncoated foil portion 54 may be 1, 2, 3, 4, 5, 6, 7, 8, 9, 10, 11, 12, 13, 14, 15, 16, 17, 18, 19, 20 millimeters, or any width in a range between any two of these values. In other embodiments, the width of the uncoated foil portion 54 may be 5-10, 10-20, 20-30, 30-40, or 40-50 millimeters or more in width. Thus, the embodiment shown in FIGS. 5-7 can provide a simplified and cost-effective dry electrode making procedure for energy storage devices.

FIGS. 8-10 illustrate a process of making an example dry electrode according to another embodiment. In FIG. 8, an electrochemically active free-standing film 80 is shown. The active free-standing film 80 may be longer than the active free-standing film 34 shown in FIG. 2 and the active free-standing film 56 shown in FIG. 5. FIG. 9 shows a metal foil 90. The metal foil 90 is discontinuously or intermittently coated with an adhesive in a longitudinal direction thereof as shown in FIG. 9. The active free-standing film 80 may be similar in dimension to the metal foil 90. The metal coil 90 includes coated portions 92 (or intermittently adhesive coated metal foil portions) and uncoated portions 94 (or uncoated metal foil portions). The coated portions 92 and the uncoated portions 94 are alternately formed with respect to each other as shown in FIG. 9. The discontinuously coated metal foil portions 92 may be formed by intermittently coating an adhesive (described above) on the metal foil 90 via, for example, gravure roll coating, slot die coating, screen printing or laser jet printing.

In FIGS. 9 and 10, x represents the width of each of the uncoated metal foil portions 94 measured in the longitudinal direction of the metal foil 90, and y represents the width of each of the coated metal foil portions 92/102 measured in the longitudinal direction. Although only three sets of the coated portions 92 and the uncoated portions 94 are shown in FIG. 9, more pairs of coated portions and uncoated portions can be formed (not shown). Those more pairs can be alternately formed with respect to each other. It should be realized that the ration of x/y may be any value where y is typically greater than x such that the width of the coated portion is greater than the value of the uncoated portion. In one embodiment, as discussed more fully below, the width y relates to the circumference of the final electrode winding such that each uncoated section 94 aligns with each other when the laminate film is wound into a rolled electrode format.

Similarly to FIGS. 5 and 6, after the active free-standing film 80 is placed over the intermittently adhesive coated metal foil portions 92 and the uncoated metal foil portions 94 of the metal foil 90, heat and/or pressure may be applied to the stacked layers (80, so that the active free-standing film 80 is laminated onto the adhesive coated metal foil portions 92. Again, the active free-standing film 80 may not be adhered or very weakly attached to the uncoated metal foil portions 94 on which no adhesive is formed. Since there are three uncoated metal foil portions 94 provided in FIG. 9, the laminated film 100 in FIG. 10 would initially include three portions (not shown) of the active free-standing film 80 that respectively vertically overlap the three uncoated metal foil portions 94 (before the three portions are removed). After the overlapping portions of the active free-standing film 80 are removed, a discontinuously or intermittently coated dry electrode 100 is formed (FIG. 10). The peeling or removal of the overlapping portions of the active free-standing film 80 can be done in the same way discussed above with respect to the embodiments of FIGS. 5-7.

The electrode 100 includes intermittently coated portions 102 and uncoated foil portions 94. At least one of the uncoated foil portions 94 can be used for electrically connecting the electrode 100 to other elements such as an electrode tab. The dimension of each of the uncoated portions 94 may be substantially smaller than the uncoated portion 48 of the continuously coated dry electrode 46 in FIG. 4. Thus, the embodiment shown in FIGS. 8-10 can also provide a simplified and cost-effective dry electrode making procedure for energy storage devices.

FIGS. 11-13 illustrate a process of making an example dry electrode according to another embodiment. In FIG. 11, an electrochemically active free-standing film 110 and a metal foil 120 uncoated with an adhesive are shown. The active free-standing film 110 may have the same dimension as that of the active free-standing film 80 shown in FIG. 8. The active free-standing film 110 is placed over and aligned with the uncoated metal foil 120 before a laminator roll procedure in FIG. 12 is performed. For the purpose of illustrating both the active free-standing film 110 and the uncoated metal foil 120, FIG. 11 shows that the two elements 110 and 120 are slightly misaligned with each other, however, the elements 110 and 120 would be aligned before the laminator roll procedure.

Referring to FIG. 12, the active free-standing film 110 and the uncoated metal foil 120 are inserted into and laminated by a laminator roll assembly 130. The laminator roll assembly 130 includes a pair of rollers 132 and 134. The rollers 132 and 134 may have substantially the same diameter. The rollers 132 and 134 may be formed of the same material or different materials having the same or similar level of hardness so that a substantially uniform pressure is applied to the stacked layers (110, 120) by both of the rollers 132 and 134. The rollers 132 and 134 respectively have openings 136 and 138. The openings 136 and 138 may have the same dimension. In one embodiment, the openings 136 and 138 may have the same width or circumferential length (x) and same depths. In another embodiment, the openings 136 and 138 may have the same width (x), but may have different depths. Each of the openings 136 and 138 has a width (x) which is the same as that of each of uncoated metal foil portions 144 shown in FIG. 13. The length (y) of the remaining portion of each of the rollers 132 and 134 is the same as the width of each of intermittently coated portions 142 shown in FIG. 13.

A skilled person would appreciate that each of the laminate rollers 132 and 134 may have different dimensions of x and y, depending on the required dimensions of the intermittently coated portions 142 and the uncoated metal foil portions 144. For example, when the width (x) of each uncoated metal foil portion becomes greater, circumferential lengths of the openings also become greater. In contrast, when the width (x) of each uncoated metal foil portion becomes smaller, circumferential lengths of the openings also become smaller. Once the dimension of x is defined, the dimension of the remaining portion (y) may be automatically defined.

During the laminating procedure in FIG. 12, the rollers 132 and 134 are positioned adjacent to each other such that the openings 136 and 138 are aligned with each other as shown in FIG. 12. When the stacked layers (110, 120) are inserted between the rollers 132 and 134, the two layers (110, 120) are laminated into each other except for the portions that pass through the openings 136 and 138, as the stacked layers (110, 120) are not pressed by the rollers 132, 134 in the openings 136 and 138. The non-pressed portions of the active free-standing film 110 may be peeled off so that an intermittently coated dry electrode 140 is formed as shown in FIG. 13. The peeling procedure can be performed in the same way described above with respect the previous embodiments.

Although each of the rollers 132 and 134 of FIG. 12 includes an opening, only one of the rollers 132 and 134 may have an opening. In this embodiment, only one of the two layers (110, 120) is directly contacted by the rollers 132 and 134 in the opening area, during the laminating roll procedure.

In another embodiment, each of the rollers 132 and 134 may include a plurality of openings (not shown). In this embodiment, each roller may have a dimension larger than the rollers 132 and 134 shown in FIG. 12. For example, two or more openings spaced apart from each other are formed in each of the rollers 132 and 134. These rollers may have the same dimension and the same number of openings. Furthermore, the openings of each roller may be circumferentially aligned with each other during the laminating roll procedure so that the same portions of the active free-standing film 110 that form the x areas are not directly pressed by either of the rollers. The length of each of the openings may be the same as the width (x) of each of the uncoated metal foil portions 144. The distance between adjacent openings may be the same as the width (y) of each of the intermittently coated portions 142. In this embodiment, the laminating procedure and the peeling procedure can be more efficiently performed.

The above dry electrode making procedure can be applicable to a single-side coated electrode, a double-side coated electrode, and an offset coated electrode or asymmetric intermittent double-side coated dry laminate (double-side coated electrode with an intermittent pattern on one side differing from the other side to be described with respect to FIGS. 17-20). In the double-side coated electrode, the intermittent pattern on one side can be symmetric to that on the other side.

FIGS. 14-16 illustrate a process of making an example dry electrode according to another embodiment. In FIG. 14, an electrochemically active free-standing film 150 and a metal foil 162 uncoated with an adhesive are shown. The active free-standing film 150 may have the same dimension as that of the active free-standing film 110 shown in FIG. 11. The active free-standing film 150 is placed over and aligned with the uncoated metal foil 162 before a laminator roll procedure in FIG. 15 is performed.

Referring to FIG. 15, the active free-standing film 150 and the uncoated metal foil 162 are inserted into and laminated by a laminator roll assembly 170. The laminator roll assembly 170 includes a pair of rollers 175 and 177. The rollers 175 and 177 may have substantially the same diameter. The rollers 175 and 177 may be formed of the same material or different materials having the same level of hardness so that a substantially uniform pressure is applied to the stacked layers (150, 162) by both of the rollers 175 and 177.

The relative position (e.g., vertical position) of the rollers 175 and 177 may be controlled such that a gap therebetween is periodically closed or opened while the rollers 175 and 177 are being rotated. In FIG. 15, reference numerals 172 and 176 represent a closed gap, and reference numeral 174 represents an open gap. In one embodiment, the intermittent periodicity of an intermittently coated dry electrode 180 shown in FIG. 16 can be governed by the duration of applied pressure to the two layers 150 and 162 to produce a dimension x and a dimension y. In this embodiment, the dimension y, where the free-standing film 150 is attached to the metal foil 162, is produced when the rollers 175 and 177 are closed (see 172 and 176 in FIG. 15). The length (y) or the width of each of intermittently coated portions 184 shown in FIG. 16 may be proportional to the duration of the rollers 175 and 177 being closed (172, 176). For example, the longer the duration of the rollers 175 and 177 being closed, the larger the length y is, and vice versa. Furthermore, the dimension x, where the free-standing film 150 is not attached to (but merely placed over) the metal foil 162, is produced when the rollers 175 and 177 are opened (see 174 in FIG. 15). The length (x) between adjacent intermittently coated portions 184 may be proportional to the duration of the rollers 175 and 177 being opened (174). For example, the longer the duration of the rollers 175 and 177 being opened (174), the larger the length x is, and vice versa. In one embodiment, both of the rollers 175 and 177 are moved to open or close the gaps therebetween. In another embodiment, only one of the rollers 175 and 177 is moved to open or close the gaps therebetween.

When the gaps of the rollers 175 and 177 are closed (172, 176), the stacked layers (150 and 162) are pressed by the rollers 175 and 177 and thus laminated into each other. When the gaps of the rollers 175 and 177 are opened (174), the stacked layers (150 and 162) are not pressed by the rollers 175 and 177 and thus not laminated into each other (i.e., merely placed over each other). The non-pressed portions of the active free-standing film 150 are removed so that the intermittently coated dry electrode 180 is formed as shown in FIG. 16. The removal procedure may be performed in the same way described above with respect to the previous embodiments. This way, the laminating procedure and the removal procedure can be more efficiently performed.

The above dry electrode making procedure can be applicable to a single-side coated electrode, a double-side coated electrode, and an offset coated electrode or asymmetric intermittent double-side coated dry laminate (double-side coated electrode with an intermittent pattern on one side differing from the other side to be described with respect to FIGS. 17-20).

FIGS. 17 and 18 illustrate a process of making an asymmetric intermittent double-side coated dry laminate 300 with the use of a laminator roll assembly 320 according to one embodiment. FIG. 17 illustrates a laminator roll assembly 320 that produces the asymmetric intermittent double-side coated dry laminate 300 shown in FIG. 18 according to an embodiment. FIG. 18 illustrates a cross-sectional view of the asymmetric intermittent double-side coated dry laminate 300 produced by the laminator roll assembly 320 shown in FIG. 17 according to an embodiment. As briefly described above with respect to FIGS. 14-16 and as shown in FIG. 18, the asymmetric intermittent double-side coated dry laminate 300 (or offset coated dry electrode) is a double-sided electrode with an intermittent pattern on one side that differs from the other side.

Referring to FIG. 17, the laminator roll assembly 320 includes upper and lower laminator rollers 307 and 309. The roll assembly 320 receives a first film roll 304, a second film roll 306 and a roll of an adhesive metal foil 305. The first film roll 304 indicates a roll of an electrochemically active free-standing film for a first intermittent dry laminate 301 shown in FIG. 18. The second film roll 306 indicates a roll of an electrochemically active free-standing film for a second intermittent dry laminate 302 shown in FIG. 18. The adhesive metal foil roll 305 indicates a roll of an asymmetric intermittently coated adhesive metal foil 303 shown in FIG. 18. The adhesive metal foil roll 305 is interposed between the first and second film rolls 304 and 306 when being inserted into the roll assembly 320. The first film roll 304, the metal foil roll 305 and the second film roll 306 may be simultaneously unwound as the films and the metal layer are inserted between and pressed by the upper and lower rollers 307 and 309. Similarly to the process shown in FIG. 15, the upper roller 307 is controlled to periodically press the first film roll 304 against the adhesive metal foil 305 to produce the first intermittent dry laminate 301. For example, the first film roll 304 is pressed for a duration of the length "a" and not pressed for a duration of the length "b" shown in FIG. 18. Furthermore, the lower roller 309 is controlled to periodically press the first second film roll 306 against the adhesive metal foil 305 to produce the second intermittent dry laminate 302. For example, the second film roll 306 is pressed for a duration of the length "c" and not pressed for a period of the length "d" shown in FIG. 18. The non-pressed areas may be removed from the laminated layer 308 in the same manner described above to produce the asymmetric intermittent double-side coated dry laminate 300 shown in FIG. 18. The removed portions may at least partially vertically overlap each other. The film portions of the first intermittent dry laminate 301 may at least partially vertically overlap the film portions of the second intermittent dry laminate 302 as shown in FIG. 18.

Referring to FIG. 18, the first intermittent dry laminate 301 and the second intermittent dry laminate 302 are asymmetric to each other. For example, the length a of each of the laminated portions of the first intermittent dry laminate 301 is different from the length c of each of the laminated portions of the second intermittent dry laminate 302. Furthermore, the length b of the exposed portion of the upper surface of the metal foil 303 is also different from the length d of the exposed portion of the lower surface of the metal foil 303. In some embodiments, the length b is less than the distance d as shown in FIG. 18. In other embodiments, the length b is greater than the length d (not shown). Furthermore, in some embodiments, the length c is less than the length a as shown in FIG. 18. In other embodiments, the length c is greater than the length a (not shown).

Although FIGS. 17 and 18 show a process of making an asymmetric intermittent double-side coated dry laminate, a symmetric intermittent double-side coated dry laminate can also be made in the same way except that the pressing interval or duration would be the same for the upper and lower laminator rollers 307 and 309. Furthermore, FIGS. 17 and 18 show merely an example process of making an asymmetric intermittent double-side coated dry laminate, other roller assembly configurations and/or other arrangements of film rolls and metal foil roll may also be possible.

FIGS. 19 and 20 illustrate a process of making an asymmetric intermittent double-side coated dry laminate 310 with the use of a laminator roll assembly 340 according to another embodiment. FIG. 19 illustrates the laminator roll assembly 340 that produces the asymmetric intermittent double-side coated dry laminate 310 shown in FIG. 20 according to another embodiment. FIG. 20 illustrates a cross-sectional view of the asymmetric intermittent double-side coated dry laminate 310 produced by the laminator roll assembly 340 shown in FIG. 19 according to another embodiment. Referring to FIG. 19, the laminator roll assembly 340 includes a first laminator roll assembly 350 and a second laminator roll assembly 360. The first laminator roll assembly 350 includes a first pair of laminator rollers 317 and 321, and the second laminator roll assembly 360 includes a second pair of laminator rollers 323 and 318. The roller 317 has an opening 352 with a width or circumferential length (b). The roller 318 has an opening 354 with a width or circumferential length (d) which is different from the circumferential length (b).

The first roll assembly 350 receives a first film roll 314 and an uncoated metal foil roll 315. The first film roll 314 indicates a roll of an electrochemically active free-standing film for a first intermittent dry laminate 311 shown in FIG. 20. The second roll assembly 360 receives the first film roll 314, the uncoated metal foil roll 315 and a second film roll 316. The second film roll 316 indicates a roll of an electrochemically active free-standing film for a second intermittent dry laminate 312 shown in FIG. 20. The uncoated metal foil roll 315 indicates a roll of an asymmetric intermittently coated adhesive metal foil 313 shown in FIG. 20. The uncoated metal foil roll 315 is interposed between the first and second film rolls 314 and 316 when being inserted into the second roll assembly 360. In other embodiments, the second film roll 316 and the uncoated metal foil roll 315 may be inserted into the first roll assembly 350 while the first film roll 314 (along with the second film roll 316 and the uncoated metal foil roll 315) is inserted into the second roll assembly 360. In these embodiments, the roller 321 would have an opening with a circumferential length d and the roller 323 would have an opening with a circumferential length b. The first film roll 314 and the metal foil roll 315 may be unwounded before the second film roll 316 is unwound.

Similarly to the process shown in FIG. 17, when the first film roll 314 and the uncoated metal foil roll 315 are inserted into the rollers 317 and 321 to produce a first laminated layer 330 when exiting the first roll assembly 350, and subsequently the first laminated layer 330 and the second film roll 316 are inserted into the rollers 323 and 318 to produce a second laminated layer 319 when exiting the second roll assembly 360. The three layers 314, 315 and 316 are laminated into each other except for the portions of the layers 314 and 316 that pass through the openings 352 and 354. The non-pressed portions may be removed from the second laminated layer 319 so that the asymmetric intermittent double-side coated dry laminate 310 is formed as shown in FIG. 20.

Although FIGS. 19 and 20 show a process of making an asymmetric intermittent double-side coated dry laminate, a symmetric intermittent double-side coated dry laminate can be made in the same way except that the widths of the openings would be the same for the upper and lower laminator rollers 317 and 318. Again, FIGS. 19 and 20 show merely an example process of making an asymmetric intermittent double-side coated dry laminate, other roller assembly configurations and/or other arrangements of film rolls and metal foil roll may also be possible.

FIG. 21 illustrates an intermittently coated dry electrode 198 to be connected to an electrode tab according to an embodiment. The intermittently coated dry electrode 198 includes laminated portions 192 and 194 where an electrochemically active free-standing film is laminated onto a metal foil. The intermittently coated dry electrode 198 further includes an uncoated metal foil portion 196 described above. The uncoated metal foil portion 196 is used for connecting the dry electrode 198 to an electrode tab (see FIG. 21) or other electrical component for connection with an external device (not shown). Although FIG. 21 shows a single uncoated metal foil portion 196, the electrode tab or other electrical component can be attached to one or more of a plurality of uncoated metal foil portions, for example, shown in FIGS. 10, 13 and 16.

Figure 22:
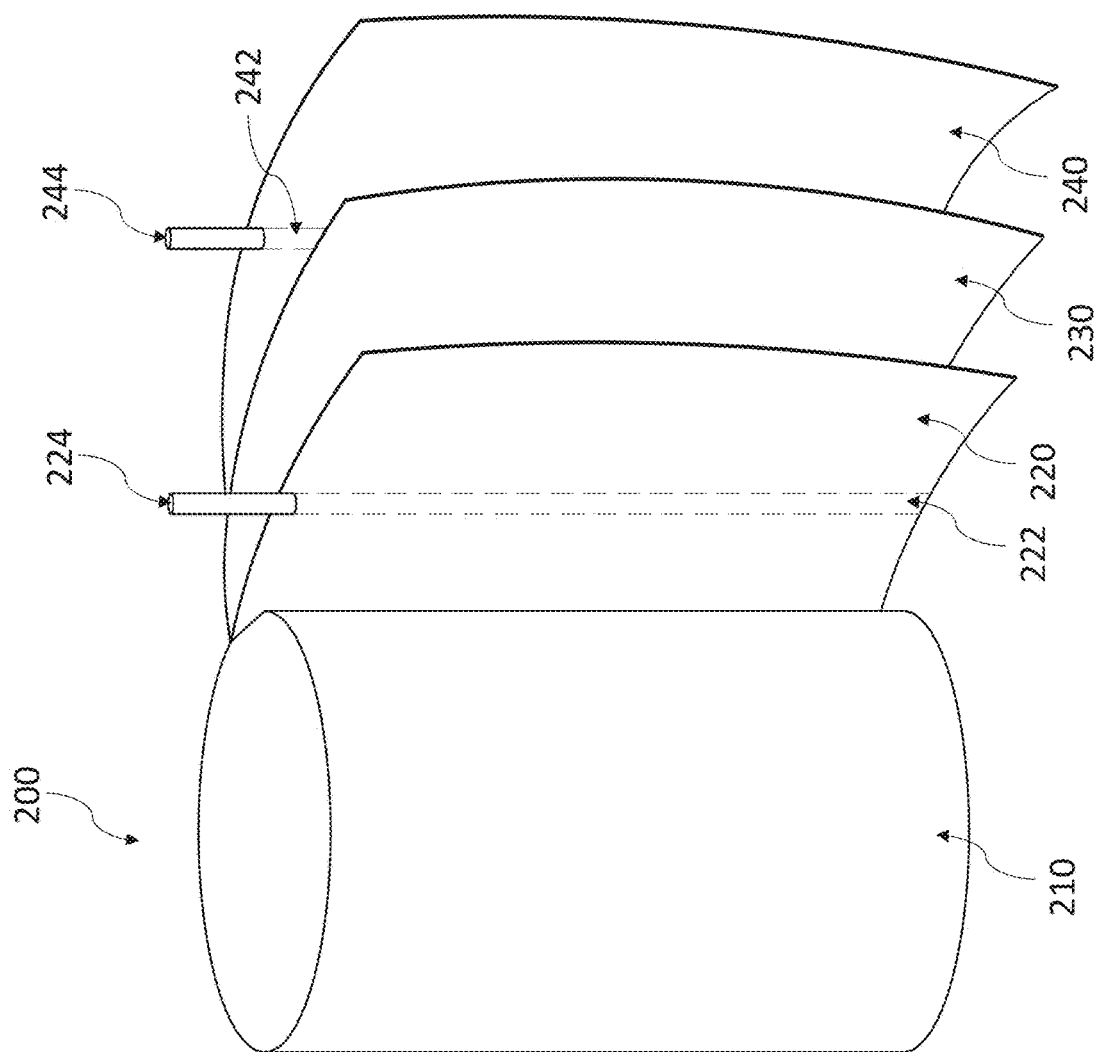
FIG. 22 illustrates an energy storage device according to an embodiment.

FIG. 22 illustrates an energy storage device 200 according to an embodiment. The energy storage device 200 can be a battery, a capacitor or a hybrid type that combines the battery and the capacitor. The battery can include a liquid electrolyte battery or a polymer electrolyte battery or solid state battery. The polymer electrolyte may include a solid polymer electrolyte and plasticized gel polymer electrolyte. The liquid electrolyte battery may include a lithium ion battery. The polymer electrolyte battery may include a lithium polymer battery. The battery may have a cylindrical shape, a prismatic shape or a pouch shape.

The energy storage device 200 includes an electrode assembly 210. The electrode assembly 210 includes a first electrode 220, a second electrode 240, and a separator 230 positioned between the first and second electrodes 220 and 240. The separator 230 can be configured to electrically insulate the first and second electrodes 220 and 240 while permitting ionic communication between the two electrodes 220 and 240.

The first electrode 220 can be an anode (a "negative electrode") and the second electrode 240 can be a cathode (a "positive electrode"). Each of the anode and cathode electrodes 220 and 240 can be an intermittently coated dry electrode manufactured by one of the above described procedures of FIGS. 5-19. The first and second electrodes 220 and 240 respectively include non-coated metal foil portions 222 and 242 which are connected to respective electrode tabs 224 and 244 or other electrical components (not shown).

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

Figure 23:
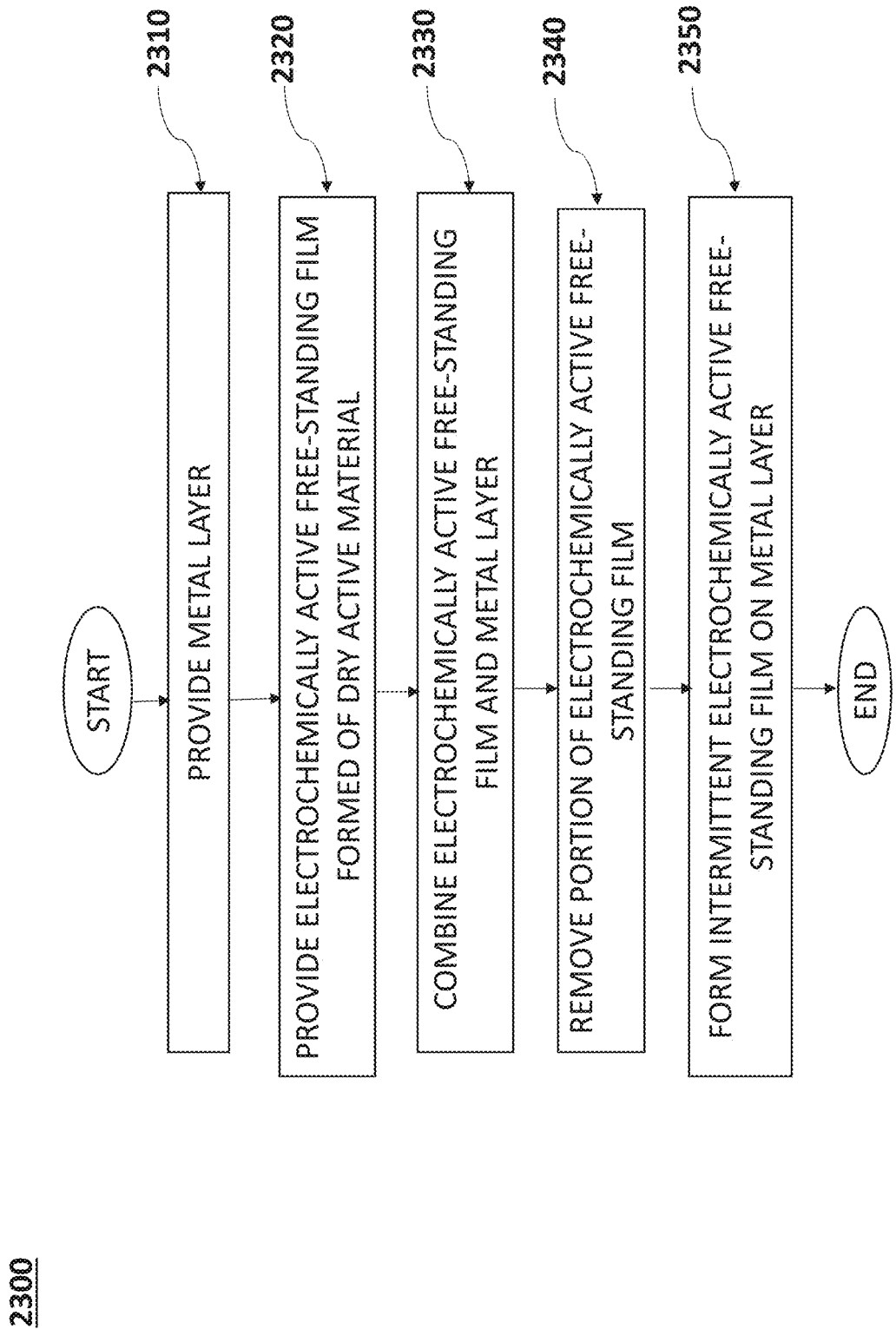
FIG. 23 illustrates a method of manufacturing a dry electrode for an energy storage device according to an embodiment.

FIG. 23 illustrates a flowchart 2300 for a method of manufacturing a dry electrode for an energy storage device according to an embodiment. Although the process flow diagram 2300 is described herein with reference to a particular order, in various embodiments, states herein may be performed in a different order, or omitted, and additional states may be added. This may apply to the flowchart 2400 shown in FIG. 24.

In state 2310, a metal layer is provided. For example, the metal layer can include a metal foil (58, 90, 120, 162) respectively shown in FIGS. 5, 9, 11 and 14. In state 2320, an electrochemically active free-standing film formed of a dry active material is provided. For example, the electrochemically active free-standing film can be an electrochemically active dry film (56, 80, 110, 150) respectively shown in FIGS. 5, 8, 11 and 14. In state 2330, the electrochemically active free-standing film and the metal layer are combined to form a combined layer. For example, the metal layer may be coated with an adhesive, the electrochemically active free-standing film may be placed over the metal layer and heat and/or pressure can be applied to the film and metal layer to combine the two elements as described with respect to FIGS. 6 and 9. As another example, the electrochemically active free-standing film may be placed over the metal layer, inserted between an opposing set of rollers and pressed by the rollers as described with respect to FIGS. 12 and 15.

In state 2340, a portion of the electrochemically active free-standing film is removed from the combined layer. For example, as described with respect to FIGS. 7, 10, 13 and 16, portions of the electrochemically active free-standing film in which an adhesive is not attached or which are not pressed by the rollers can be removed from the metal layer portion of the combined layer via peeling or slitting. In state 2350, the electrochemically active free-standing film is intermittently formed on the metal layer in a longitudinal direction of the metal layer, for example, as shown in FIGS. 7, 10, 13 and 16. As discussed above, the electrochemically active free-standing film can be formed on only one surface or opposing surfaces of the metal layer.

Figure 24:
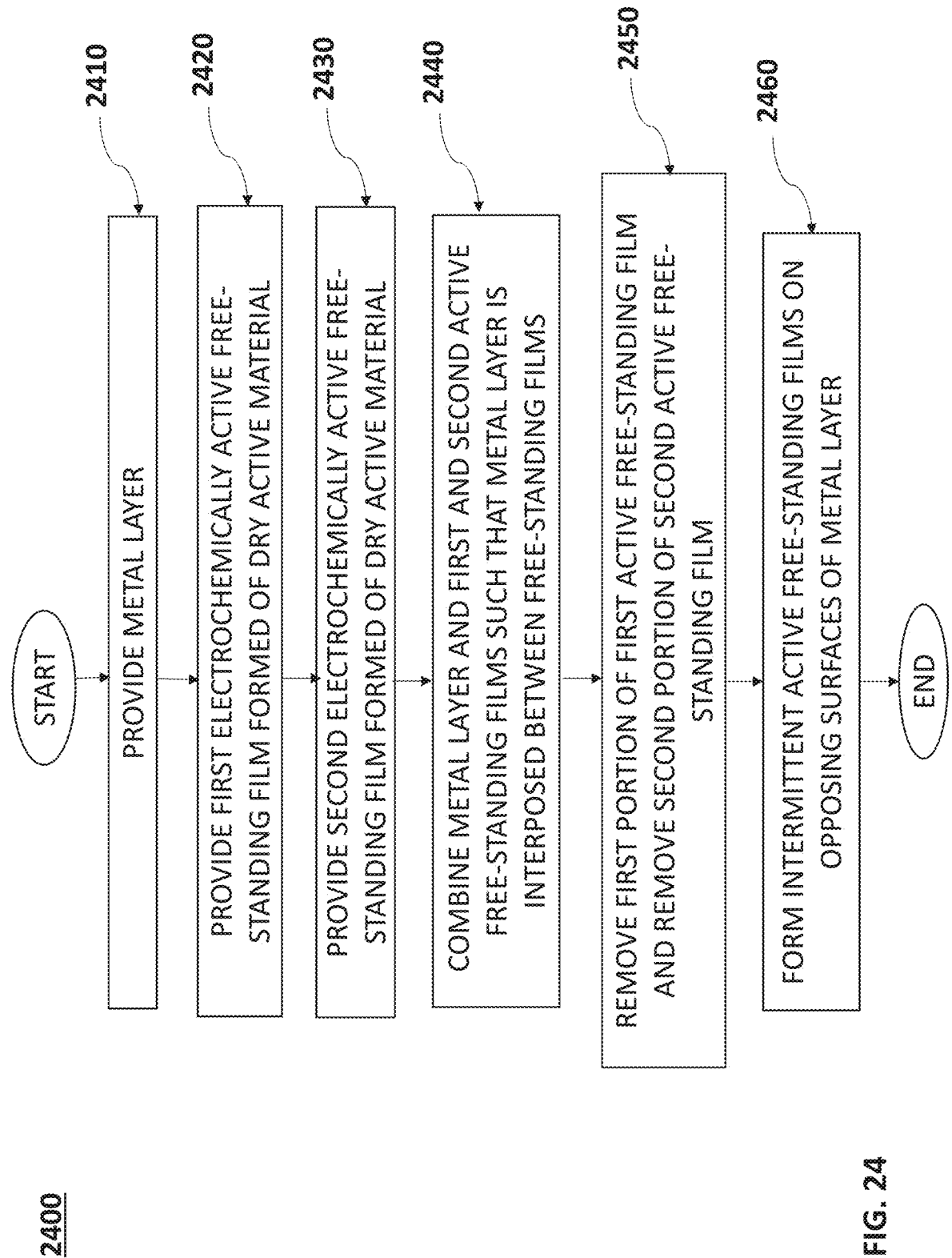
FIG. 24 illustrates a method of manufacturing a dry electrode for an energy storage device according to another embodiment.

FIG. 24 illustrates a flowchart 2400 for a method of manufacturing a dry electrode for an energy storage device according to another embodiment. In state 2410, a metal layer is provided. For example, the metal layer can include a roll of a metal foil (305, 315) shown in FIGS. 17 and 19. In state 2420, a first electrochemically active free-standing film formed of a dry active material is provided. For example, the first electrochemically active free-standing film can include a roll of a first film (304, 314) shown in FIGS. 17 and 19.

In state 2430, a second electrochemically active free-standing film formed of a dry active material is provided. For example, the second electrochemically active free-standing film can include a roll of a second film roll (306, 316) shown in FIGS. 17 and 19. In state 2440, the first and second electrochemically active free-standing films are combined with the metal layer to form a combined layer such that the metal layer is interposed between the first and second electrochemically active free-standing films. For example, the rolls of the first and second electrochemically active free-standing films with the metal layer interposed therebetween are pressed by an opposing set of rollers (e.g., one pair of rollers or two pairs of rollers) as described with respect to FIGS. 17 and 19.

In state 2450, a first portion of the first electrochemically active free-standing film and a second portion of the first electrochemically active free-standing film are removed from the combined layer as described with respect to FIGS. 18 and 20. In state 2460, intermittent electrochemically active free-standing films are formed on opposing surfaces of the metal layer, for example, as shown in FIGS. 18 and 20.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations.

Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

What is claimed is:

1. A laminator roll assembly for manufacturing a dry electrode for an energy storage device, comprising:
    a first roller; and
    a second roller disposed adjacent to the first roller,
    the first roller and the second roller configured to:
        receive a combined layer therebetween while being rotated, the combined layer comprising a metal layer and an electrochemically active free-standing film disposed on the metal layer, the electrochemically active free-standing film formed of a dry active material; and
        form a plurality of film portions of the electrochemically active free-standing film intermittently arranged on the metal layer in a longitudinal direction of the metal layer; and
        output the combined layer with the metal layer exposed by the intermittently arranged plurality of film portions.

2. The laminator roll assembly of claim 1, wherein at least one of the first roller or the second roller comprises an opening having a length.

3. The laminator roll assembly of claim 2, wherein the length of each opening is the same as a width of each of portions of the metal layer exposed by the intermittently arranged plurality of film portions, and wherein the width is measured in the longitudinal direction.

4. The laminator roll assembly of claim 1, wherein at least one of the first roller or the second roller is configured not to press the intermittently arranged plurality of film portions during rotation of the first and second rollers.

5. The laminator roll assembly of claim 1, wherein the first roller and the second roller are configured to move with respect to each other such that a gap between the first and second rollers is periodically closed and opened during rotation of the first and second rollers.

6. The laminator roll assembly of claim 5, wherein the gap is proportional to a width of the exposed portion of the metal layer.

7. The laminator roll assembly of claim 1, wherein the first roller and the second roller are configured to output the combined layer such that the exposed portion of the metal layer is not coated with an adhesive and extends in a direction crossing the longitudinal direction.

8. The laminator roll assembly of claim 1, wherein the first roller and the second roller are configured to output the combined layer such that the intermittently arranged plurality of film portions are equally spaced apart from each other.

9. A laminator roll assembly for manufacturing a dry electrode for an energy storage device, comprising:
    a first roll assembly configured to:
        receive a first electrochemically active free-standing film and a metal layer, and
        output a first laminated layer, the first laminated layer comprising a first plurality of film portions of the first electrochemically active free-standing film intermittently arranged on a first side of the metal layer in a longitudinal direction of the metal layer; and a second roll assembly spaced apart from the first roll assembly, the second roll assembly configured to:
receive the first laminated layer and a second electrochemically active free-standing film, and
output a second laminated layer, the second laminated layer comprising a second plurality of film portions of the second electrochemically active free-standing film intermittently arranged on a second side of the metal layer in the longitudinal direction, the second side opposing the first side.

10. The laminator roll assembly of claim 9, wherein the first plurality of film portions are spaced apart by a first distance, and wherein the second plurality of film portions are spaced apart by a second distance.

11. The laminator roll assembly of claim 10, wherein the first distance is different from the second distance such that an asymmetric intermittent double-side coated dry laminate is formed.

12. The laminator roll assembly of claim 10, wherein the first distance is the same as the second distance such that a symmetric intermittent double-side coated dry laminate is formed.

13. The laminator roll assembly of claim 10, wherein the first roll assembly comprises a first roller and a second roller adjacent to each other, and wherein the first roll assembly is configured to receive the first electrochemically active free-standing film and the metal layer between the first roller and the second roller during rotation of the first and second rollers.

14. The laminator roll assembly of claim 13, wherein the first roller is disposed on the first side of the metal layer and comprises a first opening formed on a circumferential portion thereof, and wherein a width of the first opening is the same as the first distance.

15. The laminator roll assembly of claim 14, wherein the first roller is configured not to press the first electrochemically active free-standing film against the metal layer on the first opening such that the first plurality of film portions of the first laminated layer are intermittently arranged on the first side of the metal layer.

16. The laminator roll assembly of claim 10, wherein the second roll assembly comprises a third roller and a fourth roller adjacent to each other, and wherein the second roll assembly is configured to receive the first laminated layer and the second electrochemically active free-standing film between the third roller and the fourth roller during rotation of the third and fourth rollers.

17. The laminator roll assembly of claim 16, wherein the fourth roller is disposed on the second side of the metal layer and comprises a second opening formed on a circumferential portion thereof, and wherein a width of the second opening is the same as the second distance.

18. The laminator roll assembly of claim 17, wherein the fourth roller is configured not to press the second electrochemically active free-standing film against the metal layer on the second opening such that the second plurality of film portions of the second laminated layer are intermittently arranged on the second side of the metal layer.

19. The laminator roll assembly of claim 9, wherein the first electrochemically active free-standing film comprises a first film roll of an electrochemically active free-standing film, wherein the second electrochemically active free-standing film comprises a second film roll of an electrochemically active free-standing film, and wherein the metal layer comprises a metal foil roll.

20. The laminator roll assembly of claim 19, wherein the first film roll and the metal foil roll are configured to be unwounded prior to the second film roll being unwounded.

* * * * *